A. N. Severance,
Cheese Press.
Nº 7,225. Patented Mar. 26, 1850.
Fig; 1.
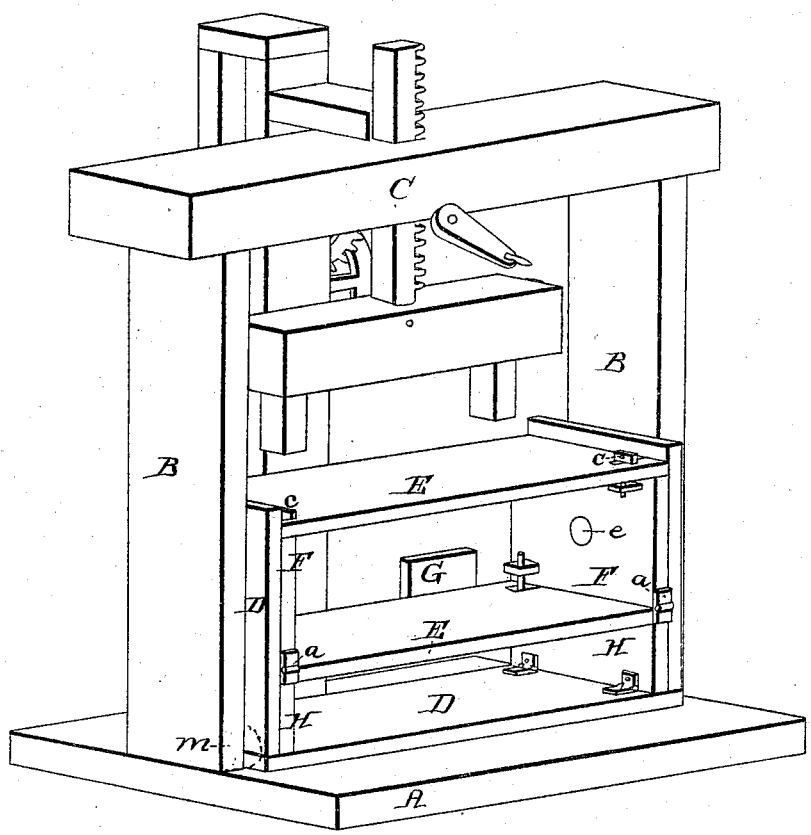
Fig; 2.
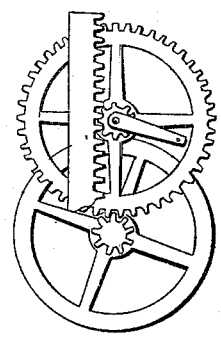

UNITED STATES PATENT OFFICE.

AUGUSTUS N. SEVERANCE, OF CHERRY VALLEY, OHIO.

CHEESE-PRESS.

Specification of Letters Patent No. 7,225, dated March 26, 1850.

*To all whom it may concern:*

Be it known that I, AUGUSTUS N. SEVERANCE, of Cherry Valley, in the county of Ashtabula, in the State of Ohio, have invented a new and Improved Mode of Constructing Cheese-Presses; and I do hereby declare that the following is a full and exact description thereof, reference being had to the accompanying drawings and the letters of reference marked thereon.

The nature of my invention consists in combining with cheese presses two beds which revolve together on a horizontal axis, and thus furnish an easy and convenient method of turning the cheese in the press.

Figure 1 of the accompanying drawing is a perspective view of a press thus constructed, and Fig. 2 is a front view of the gearing through which the pressure is transmitted to the cheese.

In constructing the press I first build a frame of suitable size to allow the beds to revolve, and allow the upper bed to turn up, upon its hinges, and admit the machinery of the press.

A, represents the sill, B, B, the cheeks or uprights, and C, the caps of the press. I also construct another frame, D, D, of suitable size to enter between the uprights of the outside frame and receive the revolving beds E, E, which are of sufficient width to receive the cheese, and a sufficient distance apart to admit the cheese hoop without difficulty. These revolving beds are connected together by the end pieces F, F, one edge of each bed being connected to the end pieces by hinges, *a, a,* and the other by the buttons *c, c,* which may be turned so as to allow the upper bed to be raised after the cheese is turned. G, G, are stops fastened to one of the beds to secure the cheese from falling out of the press, while being turned. The beds and end pieces revolve together on the journals *e, e,* which may be permanently fixed either on the end pieces or in the frame D, D, as may be most convenient. H, H are supports placed under the lower bed, to sustain the pressure upon the cheese. These supports are hinged to the sill of the frame D, D, and are turned down when the cheese is turned in the press to allow the beds to revolve, and are brought up again to the position shown in the drawing before pressure is applied to the cheese. M, represents small wheels or rollers attached to the frame D, D, to facilitate its removal from the press.

Fig. 2 shows the gearing through which the pressure is transmitted to the cheese. As this forms no part of my invention and as any other method of applying pressure may be substituted therefor it need not be particularly described.

What I claim as my invention and desire to secure by Letters Patent is—

Combining with cheese presses two beds upon which the cheese is alternately pressed which revolve together on a horizontal axis substantially in the manner, and for the purposes herein set forth.

AUGUSTUS N. SEVERANCE.

Witnesses:
 THOMAS P. HOW,
 REUBEN H. THOMPSON.